US011334719B2

(12) United States Patent
Kakadiya

(10) Patent No.: US 11,334,719 B2
(45) Date of Patent: May 17, 2022

(54) SYSTEMS AND METHODS FOR PREDICTING MAPPING BETWEEN NAMED ENTITIES AND PARAMETERS USING A MODEL BASED ON SAME PREDEFINED NUMBER OF WORDS THAT OCCUR PRIOR TO THE NAMED ENTITY VIA MACHINE LEARNING TECHNIQUES

(71) Applicant: The Abstract Operations Company, San Francisco, CA (US)

(72) Inventor: Bhavesh Kakadiya, San Francisco, CA (US)

(73) Assignee: The Abstract Operations Company, San Francisco, CA (US)

( * ) Notice: Subject to any disclaimer, the term of this patent is extended or adjusted under 35 U.S.C. 154(b) by 0 days.

(21) Appl. No.: 17/093,622

(22) Filed: Nov. 9, 2020

(65) Prior Publication Data
US 2021/0081614 A1 Mar. 18, 2021

(51) Int. Cl.
| | | |
|---|---|---|
| *G06F 40/295* | (2020.01) | |
| *G06F 9/445* | (2018.01) | |
| *G06Q 30/02* | (2012.01) | |
| *G06Q 10/10* | (2012.01) | |
| *G06N 5/04* | (2006.01) | |
| *G06N 20/00* | (2019.01) | |

(52) U.S. Cl.
CPC ............ *G06F 40/295* (2020.01); *G06N 5/04* (2013.01); *G06N 20/00* (2019.01)

(58) Field of Classification Search
CPC . G06F 9/4451; G06F 40/295; G06Q 30/0275; G06Q 10/1053

USPC .......................................................... 715/75
See application file for complete search history.

(56) References Cited

U.S. PATENT DOCUMENTS

| | | | |
|---|---|---|---|
| 8,214,747 B1* | 7/2012 | Yankovich | G06F 9/4451 |
| | | | 715/751 |
| 10,891,592 B2* | 1/2021 | Grover | G06Q 30/0275 |
| 2004/0111264 A1* | 6/2004 | Wang | G06F 40/295 |
| | | | 704/257 |
| 2019/0188645 A1* | 6/2019 | Monasor | G06Q 10/1053 |
| 2020/0065770 A1* | 2/2020 | Janapareddy | G06Q 10/1053 |

* cited by examiner

*Primary Examiner* — Farzad Kazeminezhad
(74) *Attorney, Agent, or Firm* — Cognition IP, P.C.; Edward Steakley; Rajesh Fotedar

(57) ABSTRACT

Systems, methods and computer program products are presented for a named entity recognition engine. The NER Engine initiates extraction of named entities from a document(s) and identifies one or more required parameters that correspond to a document outline type classification(s) of the document(s). The NER Engine applies a named entity recognition model to the extracted named entities to predict respective mappings between the extracted named entities and the one or more required parameters, wherein the said mapping depends on a Previous Number of Words model which is based on a same predefined number of words that appear before a named entity, as well as a model based on the named entity being included in a document sentence, and a model which depends on position of the named entity in the document. The NER Engine generates a user interface for display of the predicted respective mappings.

17 Claims, 12 Drawing Sheets

500

502 P4WM data

```
{
    <parameterOutlineId> : {
        <documentDataId> : {
            p4wm: <4 words previous to the entity>
            useTensor: <512 dimensional vector of
        }
    },
    ...
}
``` e.g. parameter-entity-prediction-models/20/p4wm.json

```
{
    87: {                    504
        20bc95894be49a26643adce0a047e600 : {
            p4wm: "Your title will be",
            useTensor: [0.05568016692996025, -0.0(
        },
        ...
    },
    333: {                   506
        20bc95894be49a26643adce0a047e600 : {
            p4wm: "a base salary of",
            useTensor: [0.05568016692996025, -0.0(
        },
        ...
    },
    ...
}
```

```
{
    522 CSM data
    <parameterOutlineId> : {
        <documentDataId> : {
            csm: <complete sentence containing th[e
            useTensor: <512 dimensional vector of
        }
    },
    ...
} e.g. parameter-entity-prediction-models/20/csm.json
{
    87: {
                524
        20bc95894be49a26643adce0a047e600 : {
            csm: "Position: Your title will be Op[e
            useTensor: [0.05568016692996025, -0.0[
        },
        ...
    },
    333: {
                526
        20bc95894be49a26643adce0a047e600 : {
            csm: "Compensation: You will be paid [a
            useTensor: [0.05568016692996025, -0.0[
        },
        ...
    },
    ...
}
```

```
{       542 LOM data
        <parameterOutlineId> : {
                <documentDataId> : {
                        absolute: <begin_offset from entity>
                        relative: <begin_offset/length of doc
                }
        },
        ...
} e.g. parameter-entity-prediction-models/20/lom.json
{
        87: {           544
                20bc95894be49a26643adce0a047e600 : {
                        absolute: 291
                        relative: 0.054535232383008
                },
                ...
        },
        333: {          546
                20bc95894be49a26643adce0a047e600 : {
                        absolute: 501
                        relative: 0.093890554712639
                },
                ...
        },
        ...
}
```

FIG. 5C

SYSTEMS AND METHODS FOR PREDICTING MAPPING BETWEEN NAMED ENTITIES AND PARAMETERS USING A MODEL BASED ON SAME PREDEFINED NUMBER OF WORDS THAT OCCUR PRIOR TO THE NAMED ENTITY VIA MACHINE LEARNING TECHNIQUES

CROSS-REFERENCE TO RELATED APPLICATIONS

This application is related to a U.S. Patent Application entitled "SYSTEMS AND METHODS FOR AUTOMATION OF CORPORATE WORKFLOW PROCESSES VIA MACHINE LEARNING TECHNIQUES," filed on Nov. 9, 2020, which is hereby incorporated by reference in its entirety.

BACKGROUND

Conventional software systems may be deployed across various organizations to store and manage data vital to organizational efficiency. In many cases, conventional software systems complete the tasks traditionally performed by employees or assist those employees in completing those tasks accurately and in a timely fashion. Certain conventional software systems may be specifically tailored and designed to manage and perform specialized functions within an organization. For example, some conventional software systems may be designed to be deployed for legal tasks, while other may be designed to be deployed for human resources tasks and/or finance department tasks. In other situation, conventional software systems may be directed to monitoring security and compliance requirements.

SUMMARY

Information shared between corporate employees via various conventional software systems across different corporate function units may become inaccurate or inconsistent. As a result, important dates, tasks and compliance requirements may be unintentionally ignored or missed, resulting in inefficiencies and substantial losses to the organization, internal stakeholders, customers and/or vendors. Such conventional software systems lack a holistic customization framework and cannot provide a sense to executives of predictability of the initiation and completion of various corporate workflows. Instead, certain employees are inevitably employed to take on roles for starting, monitoring and resolving complex and numerous corporate operational tasks.

Systems, methods and computer program products are presented for an Automation Platform that implements a named entity recognition engine ("NER Engine") for predicting whether one or more named entities correctly map to one or more parameters. The various embodiments described herein provide improvements and advantages over conventional software systems. The NER Engine provides improvements over conventional software systems by generating predictions of whether portions of text in multiple types of documents in a variety of organizational workflows provide relevant values for document parameters.

According to various embodiments, the NER Engine initiates extraction of named entities from a document(s) and identifies one or more required parameters that correspond to a document outline type classification(s) of the document(s). The NER Engine applies a named entity recognition model to the extracted named entities to predict respective mappings between the extracted named entities and the one or more required parameters. The NER Engine generates a user interface for display of the predicted respective mappings. A human end-user may access the user interface to review and annotate the predicted mappings. The human end-user may correct and revise one or more of the predicted mappings. The human end-user may approve the predicting mappings and revised predicted mappings. The approved mappings are fed back into the NER Engine to fine tune the named entity recognition model.

According to various embodiments, the NER Engine applies the named entity recognition model to determine a probability that an extracted named entity represents document data for a particular required parameter. For example, a predicted mapping may indicate whether a value for an annual salary included in a scanned job offer document provides document text data that should be mapped to a "Base Salary" document parameter of a "Job Offer" document outline type.

According to various embodiments, the NER Engine accesses component model data for the required parameter, wherein the component model data includes portions of previous document data from a plurality of different documents that mapped to the required parameter.

According to various embodiments, the NER Engine receives a user selection indicating an approval of a displayed predicted mapping between a first extracted named entity and a first required parameter. The NER Engine updates the named entity recognition model according to the approved predicted mapping. By updating the named entity recognition model based on entity-to-parameter mappings approved by human reviewers, the accuracy of the NER Engine's predictions can be steadily fine-tuned and improved as it iterates over a multitude of document types germane to a particular organization's internal workflows and processes.

Further areas of applicability of the present disclosure will become apparent from the detailed description, the claims and the drawings. The detailed description and specific examples are intended for illustration only and are not intended to limit the scope of the disclosure.

BRIEF DESCRIPTION OF THE DRAWINGS

The present disclosure will become better understood from the detailed description and the drawings, wherein:

FIGS. 5A, 5B and 5C each illustrate a diagram of an exemplary environment in which some embodiments may operate.

DETAILED DESCRIPTION

Figure 1A:
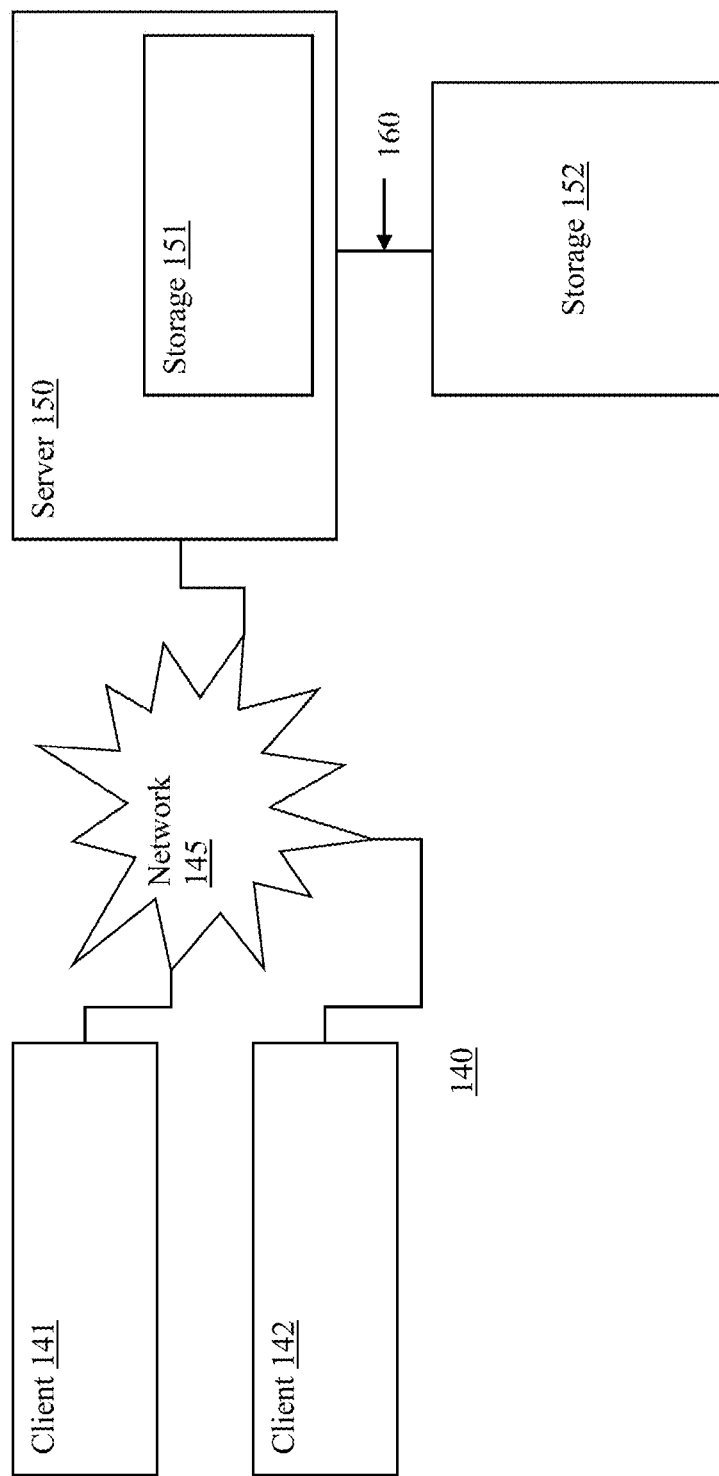
FIG. 1A is a diagram illustrating an exemplary environment in which some embodiments may operate.

In this specification, reference is made in detail to specific embodiments of the invention. Some of the embodiments or their aspects are illustrated in the drawings.

For clarity in explanation, the invention has been described with reference to specific embodiments, however it should be understood that the invention is not limited to the described embodiments. On the contrary, the invention covers alternatives, modifications, and equivalents as may be included within its scope as defined by any patent claims. The following embodiments of the invention are set forth without any loss of generality to, and without imposing limitations on, the claimed invention. In the following description, specific details are set forth in order to provide a thorough understanding of the present invention. The present invention may be practiced without some or all of these specific details. In addition, well known features may not have been described in detail to avoid unnecessarily obscuring the invention.

In addition, it should be understood that steps of the exemplary methods set forth in this exemplary patent can be performed in different orders than the order presented in this specification. Furthermore, some steps of the exemplary methods may be performed in parallel rather than being performed sequentially. Also, the steps of the exemplary methods may be performed in a network environment in which some steps are performed by different computers in the networked environment.

Some embodiments are implemented by a computer system. A computer system may include a processor, a memory, and a non-transitory computer-readable medium. The memory and non-transitory medium may store instructions for performing methods and steps described herein.

A diagram of exemplary network environment in which embodiments may operate is shown in FIG. 1A. In the exemplary environment 140, two clients 141, 142 are connected over a network 145 to a server 150 having local storage 151. Clients and servers in this environment may be computers. Server 150 may be configured to handle requests from clients. Server 150 may be implemented as a number of networked server devices, though it is illustrated as a single entity. Communications and transmissions between a base station and one or vehicles and between a base station and one or more control centers as described herein may be executed similarly as the client 141, 142 requests.

The exemplary environment 140 is illustrated with only two clients and one server for simplicity, though in practice there may be more or fewer clients and servers. The computers have been termed clients and servers, though clients can also play the role of servers and servers can also play the role of clients. In some embodiments, the clients 141, 142 may communicate with each other as well as the servers. Also, the server 150 may communicate with other servers.

The network 145 may be, for example, local area network (LAN), wide area network (WAN), telephone networks, wireless networks, intranets, the Internet, or combinations of networks. The server 150 may be connected to storage 152 over a connection medium 160, which may be a bus, crossbar, network, or other interconnect. Storage 152 may be implemented as a network of multiple storage devices, though it is illustrated as a single entity. Storage 152 may be a file system, disk, database, or other storage.

In an embodiment, the client 141 may perform the method 200 or other method herein and, as a result, store a file in the storage 152. This may be accomplished via communication over the network 145 between the client 141 and server 150. For example, the client may communicate a request to the server 150 to store a file with a specified name in the storage 152. The server 150 may respond to the request and store the file with the specified name in the storage 152. The file to be saved may exist on the client 141 or may already exist in the server's local storage 151.

In another embodiment, the client 141 may be a vehicle that sends vehicle sensor data used during execution of the method 200 or other method herein. This may be accomplished via communication over the network 145 between the client 141 and server 150. For example, the client may communicate a request to the server 150 to store a file with a specified file name in the storage 151. The server 150 may respond to the request and store the file with the specified name in the storage 151. The file to be saved may exist on the client 141 or may exist in other storage accessible via the network such as storage 152, or even in storage on the client 142 (e.g., in a peer-to-peer system).

In accordance with the above discussion, embodiments can be used to store a file on local storage such as a disk or on a removable medium like a flash drive, CD-R, or DVD-R. Furthermore, embodiments may be used to store a file on an external storage device connected to a computer over a connection medium such as a bus, crossbar, network, or other interconnect. In addition, embodiments can be used to store a file on a remote server or on a storage device accessible to the remote server.

Furthermore, cloud computing is another example where files are often stored on remote servers or remote storage systems. Cloud computing refers to pooled network resources that can be quickly provisioned so as to allow for easy scalability. Cloud computing can be used to provide software-as-a-service, platform-as-a-service, infrastructure-as-a-service, and similar features. In a cloud computing environment, a user may store a file in the "cloud," which means that the file is stored on a remote network resource though the actual hardware storing the file may be opaque to the user.

Figure 1B:
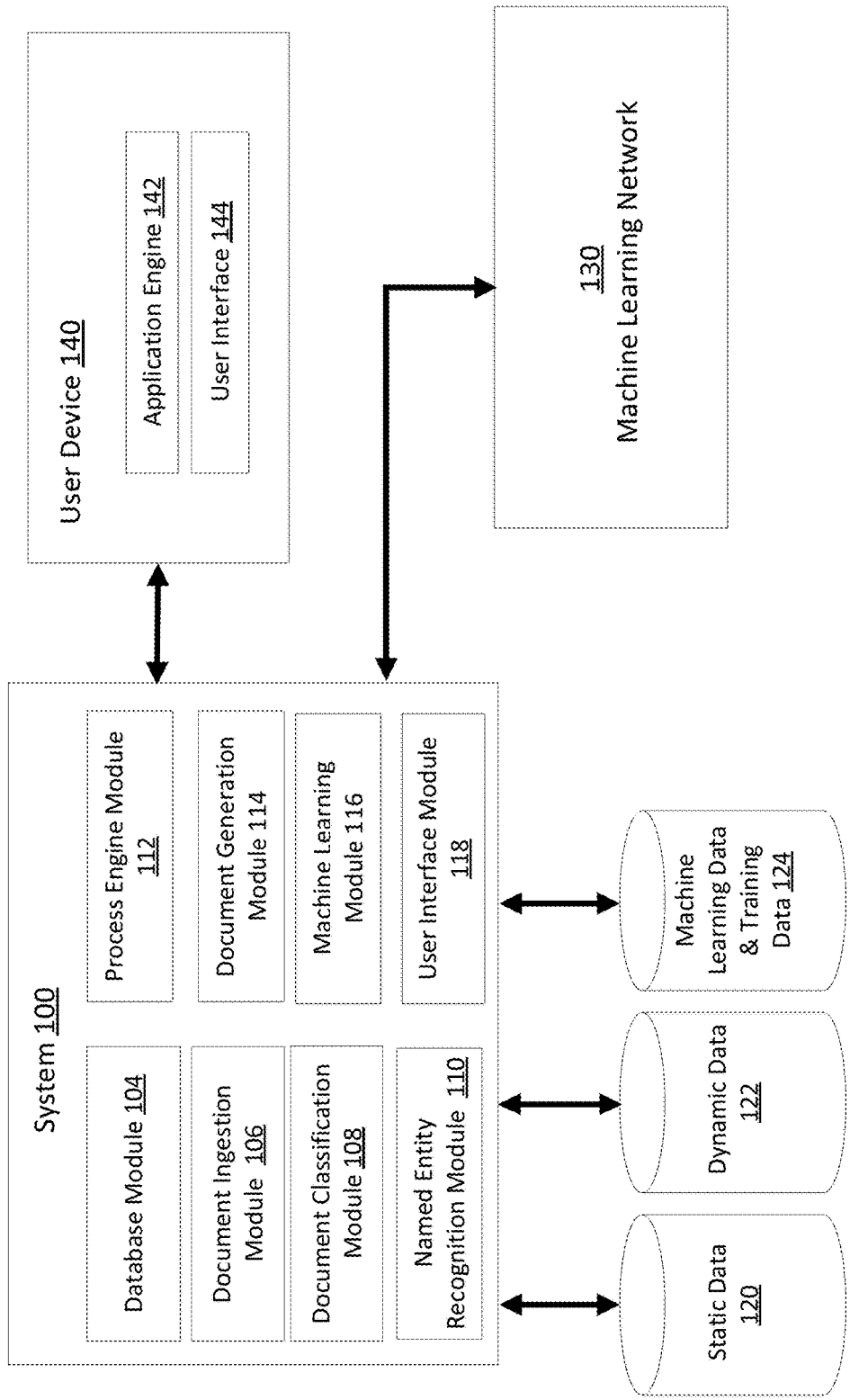
FIG. 1B is a diagram illustrating an exemplary environment in which some embodiments may operate.

FIG. 1B illustrates a block diagram of an example system 100 for an Automation Platform that includes a database module 104, a document ingestion module 106, a document classification module 108, a document entity recognition 110, a process engine module 112, a document generation module 114, a machine learning module 116 and a user interface (U.I.) module 118. The system 100 may communicate with a user device 140 to display output, via a user interface 144 generated by an application engine 142.

The database module 104 of the system 100 may perform functionality as illustrated in FIGS. 4A, 4B, 5A, 5B, 5C, and 6.

Figure 2A:
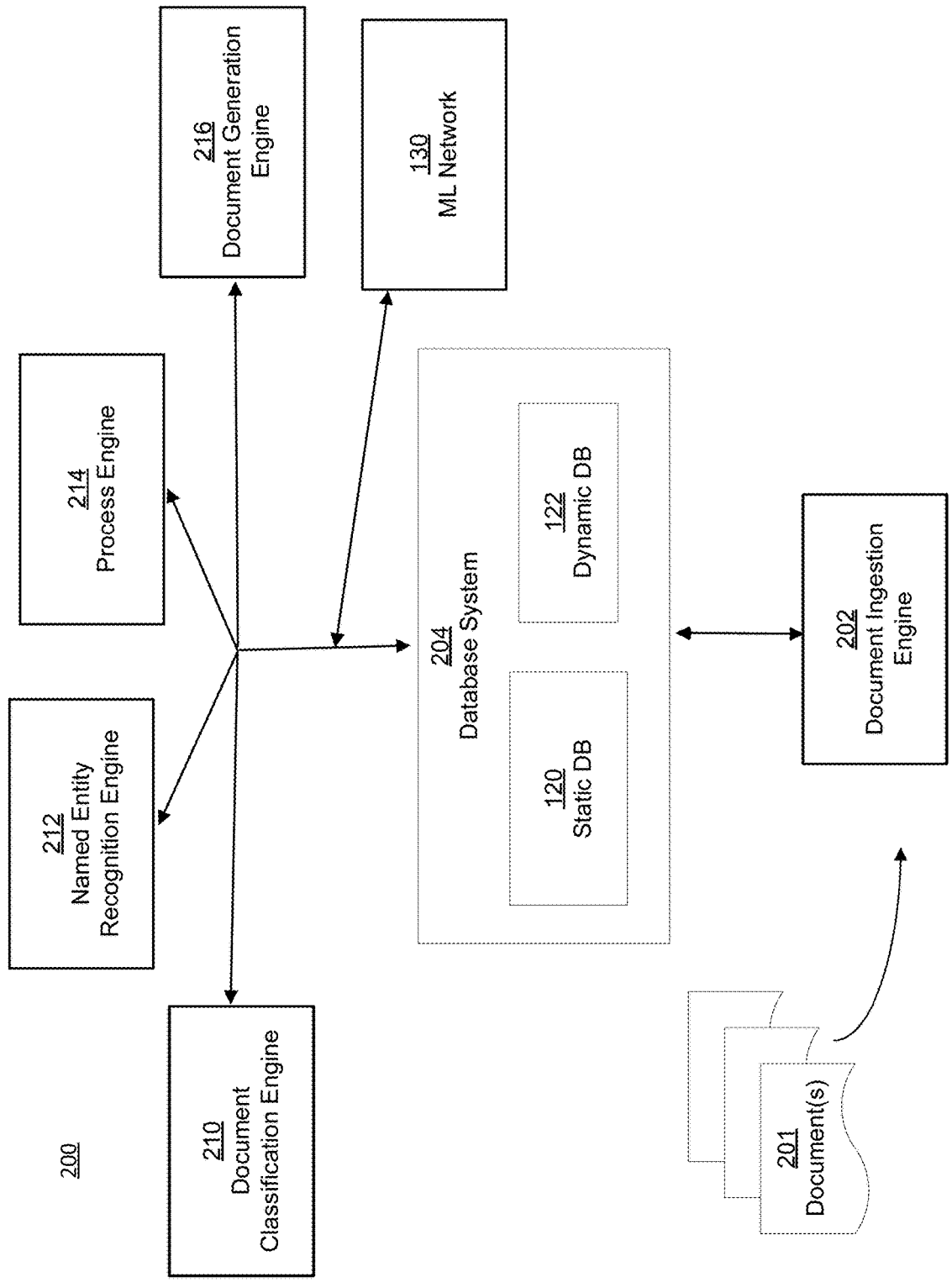
FIGS. 2A and 2B are each a diagram illustrating an exemplary environment in which some embodiments may operate.

The document ingestion module 106 of the system 100 may perform functionality illustrated in FIG. 2A.

The document classification module 108 of the system 100 may perform functionality illustrated in FIG. 2A.

The named entity recognition module 110 of the system 100 may perform functionality as illustrated in FIGS. 2A, 2B, 3, 4A, 4B, 5A, 5B, 5C, and 6.

The process engine module 112 of the system 100 may perform functionality as illustrated in FIG. 2A.

The document generation module 114 of the system 100 may perform functionality as illustrated in FIG. 2A.

The machine learning module 116 of the system 100 may perform functionality as illustrated in FIG. 2A.

Figure 2B:
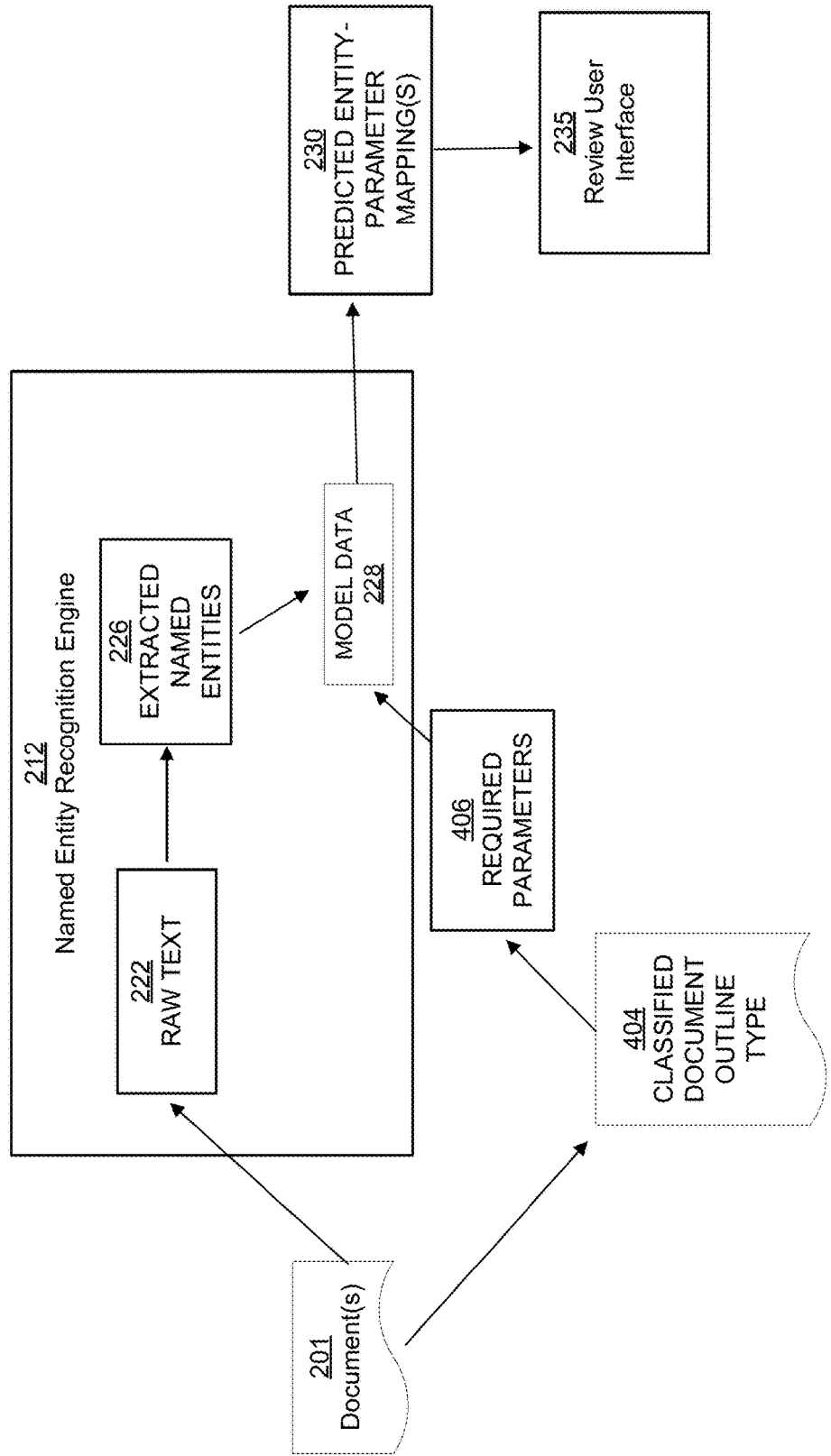
Figure 3:
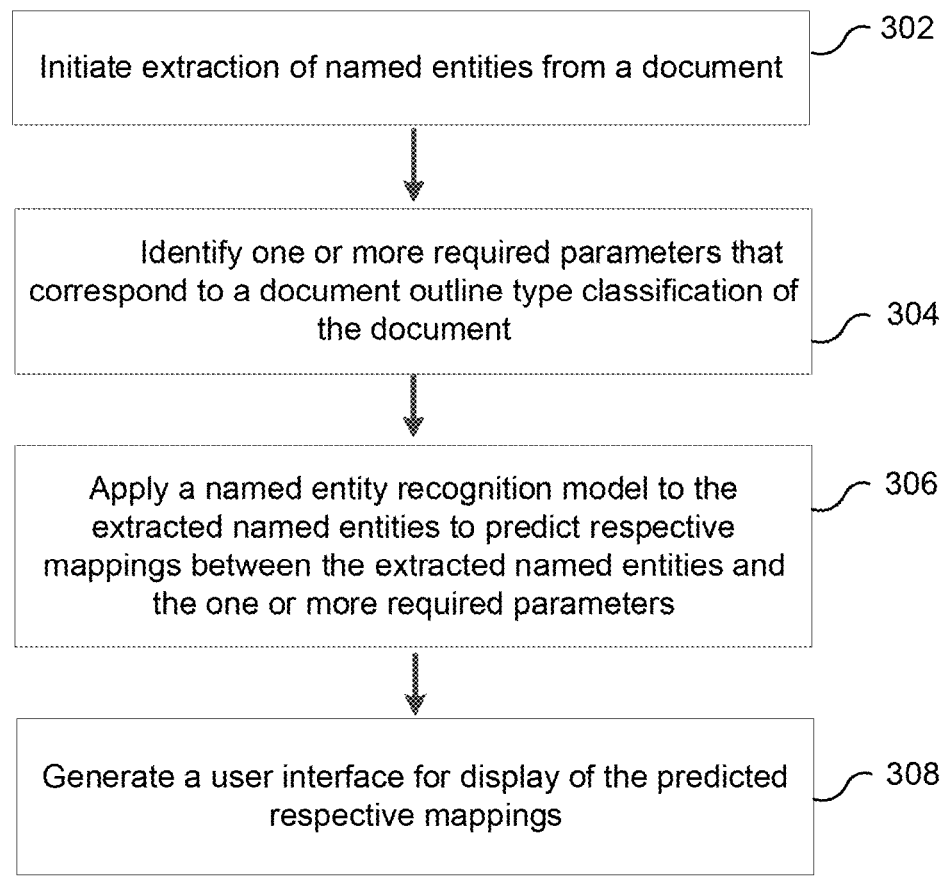
FIG. 3 is a diagram illustrating an exemplary method that may be performed in some embodiments.

The user interface module 118 of the system 100 may display information based on functionality as illustrated in FIGS. 2B and 3.

While the databases 120, 122 and 124 are displayed separately, the databases and information maintained in a database may be combined together or further separated in a manner that promotes retrieval and storage efficiency and/or data security.

As shown in diagram 200 of an Automation Platform in FIG. 2A, one or more documents 201 may be input into a document ingestion engine 202. For example, the documents 201 may be documents of any format (.doc, .pdf, email, etc.) that are stored in a memory associated with an organization, such as a particular corporation. The documents 201 may further be filtered to be associated with a set list of corporate personnel. For example, a requirement may be that any input documents 201 must have been emailed to, drafted by, or sent by any corporate executive at a particular level of management responsibility. The database system 204 stores static data in a static database 120 and dynamic data in a dynamic database 122. According to various embodiments, extracted document data may be stored in the dynamic database 122 and various defined document outlines, templates, schemas and one or more defined document parameters may be stored in the static database 120. According to various embodiments, component model data may be stored in the dynamic database 122.

According to various embodiments, the document classification engine 210 applies one or more machine learning techniques via the machine learning network 130 to the input document(s) 201 in order to classify the input documents 201 according to a document outline type(s) stored in the static database 120. The named entity recognition engine 212 applies one or more machine learning techniques via the machine learning network 130 to one or more portions of text extracted from the input documents. For example, the extracted text may be stored in the dynamic database 122 as named entities. The document classification engine 210 identifies respective parameters that correspond to the document outline type that represents the classification of the input document(s) 201. According to various embodiments, text extraction can occur at the document ingestion engine 202, the document classification engine 210 and/or the named entity recognition engine 212. According to various embodiments, identification of one or more named entities in raw text of a document(s) may be performed according to various natural language processing algorithms.

According to various embodiments, the process engine 214 builds a knowledge graph that links various types of defined document outlines (or templates, etc.) as belonging to a particular workflow (such as a corporate process) that requires the distribution and completion of various documents according to a particular sequence and/or interval. For example, in a particular sequence, one or more various tasks need to be initiated and completed via the exchange and signature of a first document type before exchange and signature of a second document type is required. However, completion of both documents is necessary in order to fully complete the particular workflow. It is understood that one or more workflow processes are not limited to a sequence that requires use of only two types of documents. A workflow process may involve any number of different types of documents and there may be any number of distinct, differing workflow processes. In addition, various workflow processes may be initiated to be automatically completed concurrently.

According to various embodiments, an end user may select to initiate a process via the process engine 214 to obtain, for example, a city business license that requires completion of a sequence of a plurality of tasks. The process engine 214 may monitor one or more organization computer systems to detect when the city license document(s) is received. The city license document may be sent through postal mail and may be scanned upon receipt in order to be ingested via the document ingestion engine 202 into the process engine 214. The process engine 214 detects the scanned and ingested city license document.

The Automation Platform implements a machine learning algorithm(s) via the document classification engine 210 in order to classify the scanned and ingested city business license document according to a document outline type. The Automation Platform further implements machine learning algorithm(s) via the named entity recognition engine 212 to extract text from the city business license document as one or more named entities to predict mappings to one or more parameters that correspond to the document outline type classification of the city business license document.

The Automation Platform implements a confidence threshold algorithm(s) to determine a confidence level regarding the document outline type that has been selected for the ingested city business license document and/or a confidence level regarding the probability of one or more mappings between named entities and required parameters. If the confidence level(s) does not meet a confidence threshold, the Automation Platform may trigger display of a review user interface. The review user interface provides an end user with functionality to correct predicted mappings the named entity recognition engine 212 calculated for extracted named entities and the document outline type's parameters. The end user may input one or more corrections and submit the corrected entity-to-parameter mappings back into the Automation Platform.

The process engine 214 of the Automation Platform scans the ingested city business license document's document outline type classification and the reviewed and submitted named entity-to-parameter mappings. The process engine 214 may schedule the initiation and required completion dates of various tasks within the city business license workflow process. The document outline type may include a parameter for renewal of the city license and a mapped named entity from the business license (that was approved by the end user via the review user interface) may provide a date value for the city license renewal parameter. The process engine 214 accesses a knowledge graph that includes a relationship between the city license renewal parameter and a corresponding task for renewing the city business license. The license renewal task may itself require the completion of different documents.

The process engine 214 calculates a start date for the license renewal task based on the date value of the named entity that mapped to the city license renewal parameter and calculates a due date for when the license renewal task will be completed. When the start date arrives, the process engine 214 automatically triggers initiation of the license renewal task and the Document Generation Engine 216 may generate one or more required documents for the license renewal task. The process engine 214 may complete and send the required documents to one or more external recipients.

As shown in the diagram 220 of FIG. 2B, the named entity recognition engine 212 ("NER Engine 212") receives a scanned document 201 and converts the scanned document to raw text 222. The scanned document may be classified by the document classification engine 210 according to a particular document outline type 404 that has one or more required parameters 406. The NER Engine 212 applies natural language processing to the raw text 222 to extract one or more named entities 226. The NER Engine 212 accesses model data 228 and applies the model data 220 to the extracted named entities 226 and the required parameters 406. The NER Engine 212 generates output that comprises predicted mappings 230 between the extracted named entities 226 to the one or more required parameters 406 of the document outline type 404.

The NER Engine 212 sends the predicted mappings 230 to the user interface module 118 for display of the predicted mappings 230 in a review user interface 235. An end user may act as a reviewer engaged in a review process via the review user interface 235. For example, the end user may approve a predicted mapping between a first extracted named entity and a first required parameter. Based on the approval of the end user, the NER Engine 212 updates the model data 228 according to the approved mapping.

As shown in flowchart 300 of FIG. 3, at step 302, the NER Engine 212 initiates extraction of named entities from a document(s). The NER Engine 212 receives the extracted named entities from the one or more natural language processing models at step 304. According to various embodiments, the NER Engine 212 converts the document content to raw text and applies one or more natural language processing (NLP) models to the raw text. The NER Engine 212 may receive the extracted named entities from the one or more natural language processing models. For example, the NER Engine 212 may implement one or more NLP techniques on the raw text. The NER Engine 212 may also send the raw text to an NLP cloud computing platform and receive the extracted named entities as output from the NLP cloud computing platform. It is understood that the NLP cloud computing platform may be internal or external to the NER Engine 212. The NLP cloud computing platform may be provided via a 3$^{rd}$ party or the NLP cloud computing platform may be a component of the NER Engine 212. At step 304, the NER Engine 212 identifies one or more required parameters that correspond to a document outline type classification(s) of the document(s).

At step 306, the NER Engine 212 applies a named entity recognition model to the extracted named entities to predict respective mappings between the extracted named entities and the one or more required parameters. According to various embodiments, the NER Engine 212 applies the named entity recognition model to determine a probability that an extracted named entity represents document data for a particular required parameter. The NER Engine 212 accesses component model data for the required parameter. Component model data may include one or more portions of previous document data from a plurality of different documents that mapped to the required parameter.

At step 308, the NER Engine 212 generates a user interface for display of the predicted respective mappings. According to various embodiments, the NER Engine 212 receives a user selection of indicating an approval of a displayed predicted mapping between a first extracted named entity and a first required parameter and the NER Engine 212 updates the named entity recognition model according to the approved predicted mapping.

To update the named entity recognition model, the NER Engine 212 captures from the document(s) an instance of Previous-4-Word ("P4W") component model data based on a predefined number of words placed before the first extracted named entity. The NER Engine 212 captures from the document an instance of Complete Sentence ("CS") component model data based on a sentence that includes the first extracted named entity. The NER Engine 212 captures from the document an instance of Location Offset ("LO") component model data based on data that corresponds to a document position of the first extracted named entity. The NER Engine 212 updates the named entity recognition model by inserting the captured instances of component model data into the named entity recognition model as respective entries that correspond to the first required parameter.

Figure 4A:
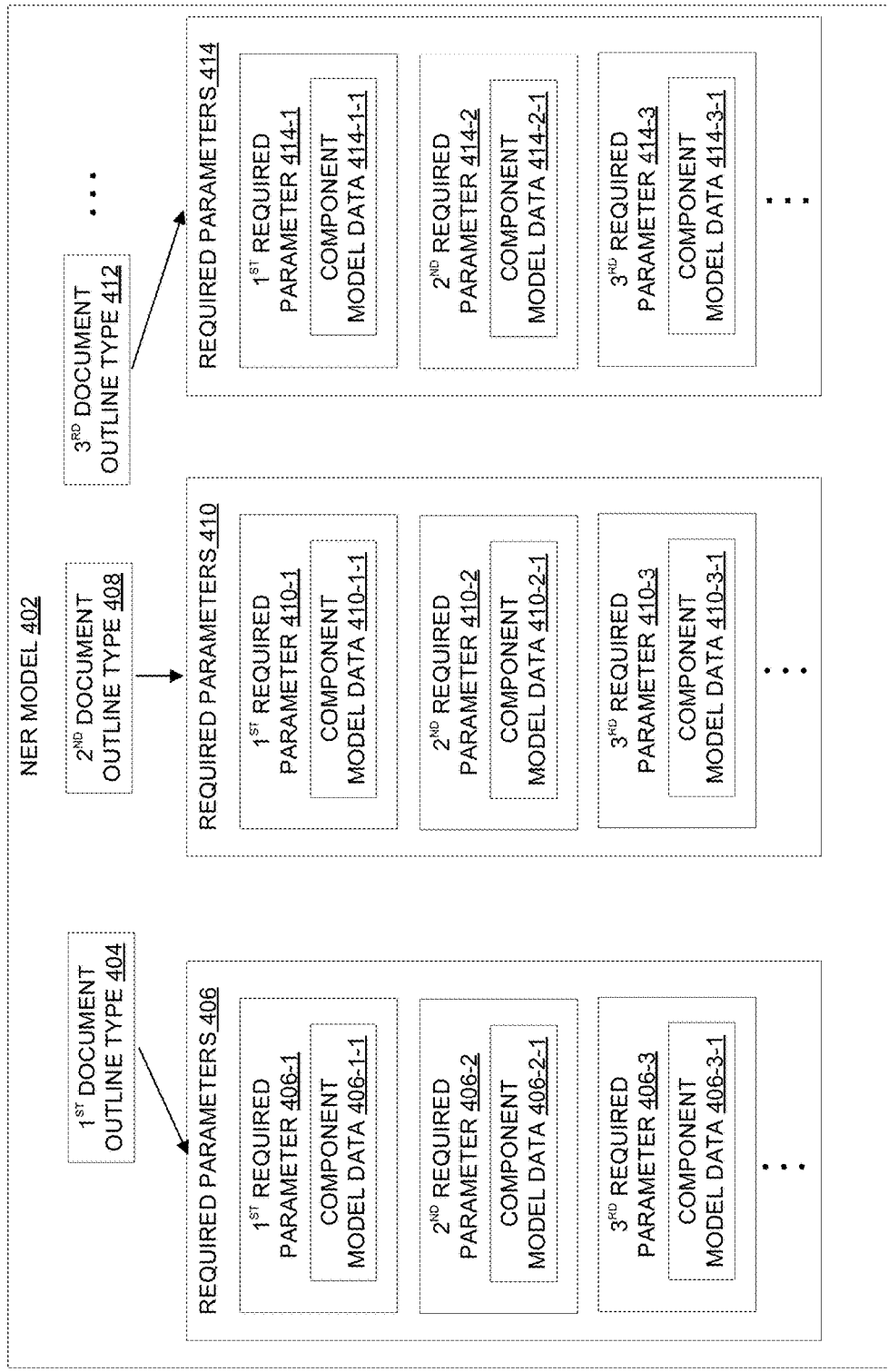
FIG. 4A is a diagram illustrating an exemplary environment in which some embodiments may operate.

As shown in the diagram 400 of FIG. 4A, an NER model 402 may have a plurality of different document outline types 404, 408, 412. For example, various workflow processes of an organization may frequently use, for example, a Job Offer Letter form, a Non-Disclosure Agreement form and/or a Job Termination Letter form, etc. Each form will have a corresponding document outline type. Each document outline type 404, 408, 412 may have a plurality of required parameters 406, 410, 414. A required parameter may be a type of document data (e.g. text from a portion of the document) that frequently appears in instances of that type of document. For example, required parameters of a document outline type that corresponds to the Job Offer Letter form may be "Start Date," "Job Title," "Base Salary," "Granted Stock Options," etc.

Each required parameter 406-1, 406-2, 406-3, 410-1, 410-2, 410-3, 414-1, 414-2, 414-3 of each document outline type 404, 408, 412 has corresponding component model data 406-1-1, 406-2-1, 406-3-1, 410-1-1, 410-2-1, 410-3-1, 414-1-1, 414-2-1, 414-3-1. Component model data for a given required parameter may be based on a plurality of documents with an extracted named entity that previously mapped to the given required parameter. According to various embodiments, component model data 406-1-1 for a required parameter 406-1 of a first document outline type 404 may include named entities with respect to separate portions of text from different documents, whereby each named entity individually mapped to the required parameter 406-1 and included data that matched to the required parameter 406-1. For example, a first Job Offer Letter document may include a first entity with text of "$150,000.00" and a second Job Offer Letter document may include a second entity of "$180,000.00." Both the first and second entities may have previously mapped to a required Base Salary parameter of the Job Offer Letter document outline type.

Figure 4B:
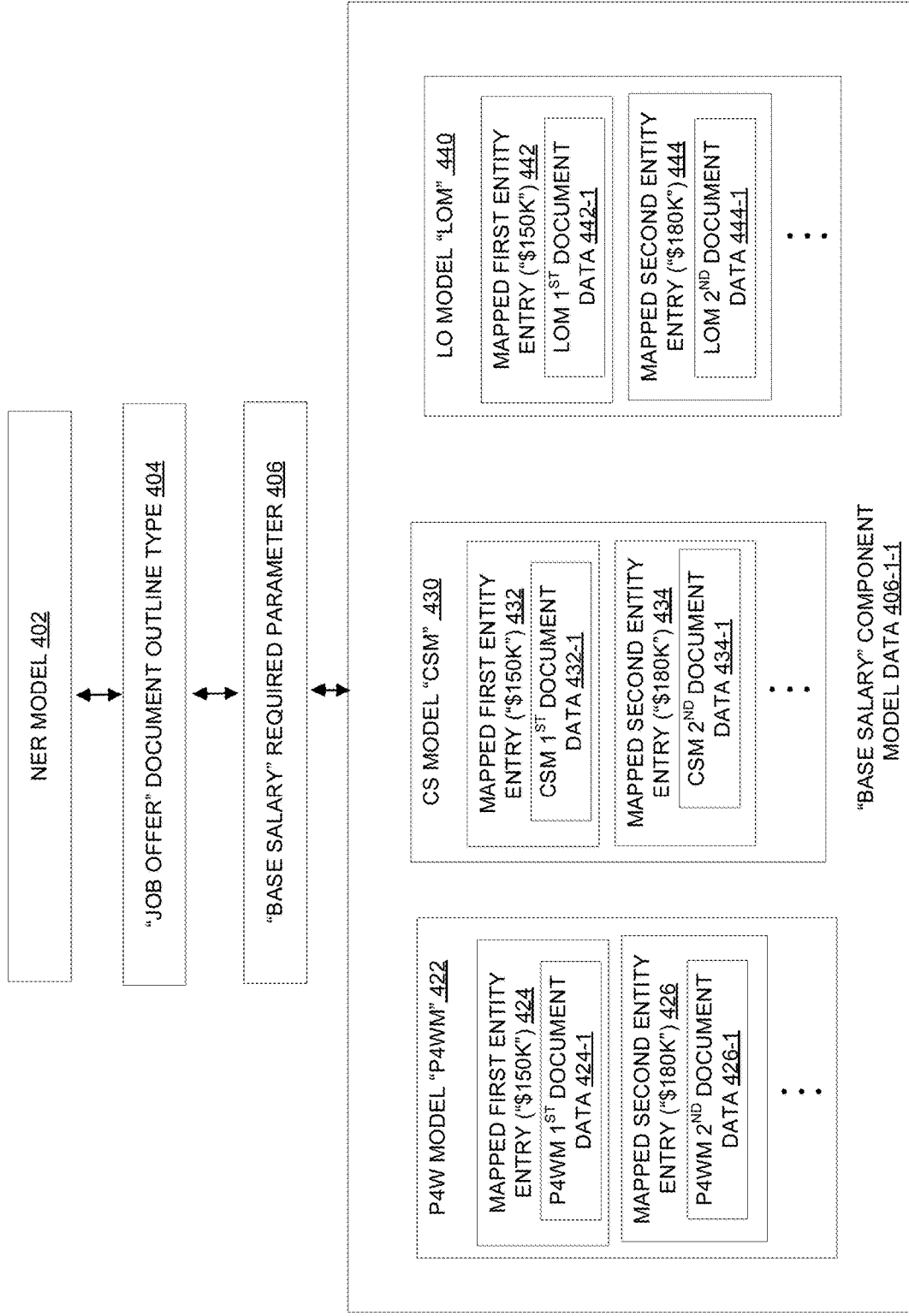
FIG. 4B is a diagram illustrating an exemplary environment in which some embodiments may operate.
Figure 6:
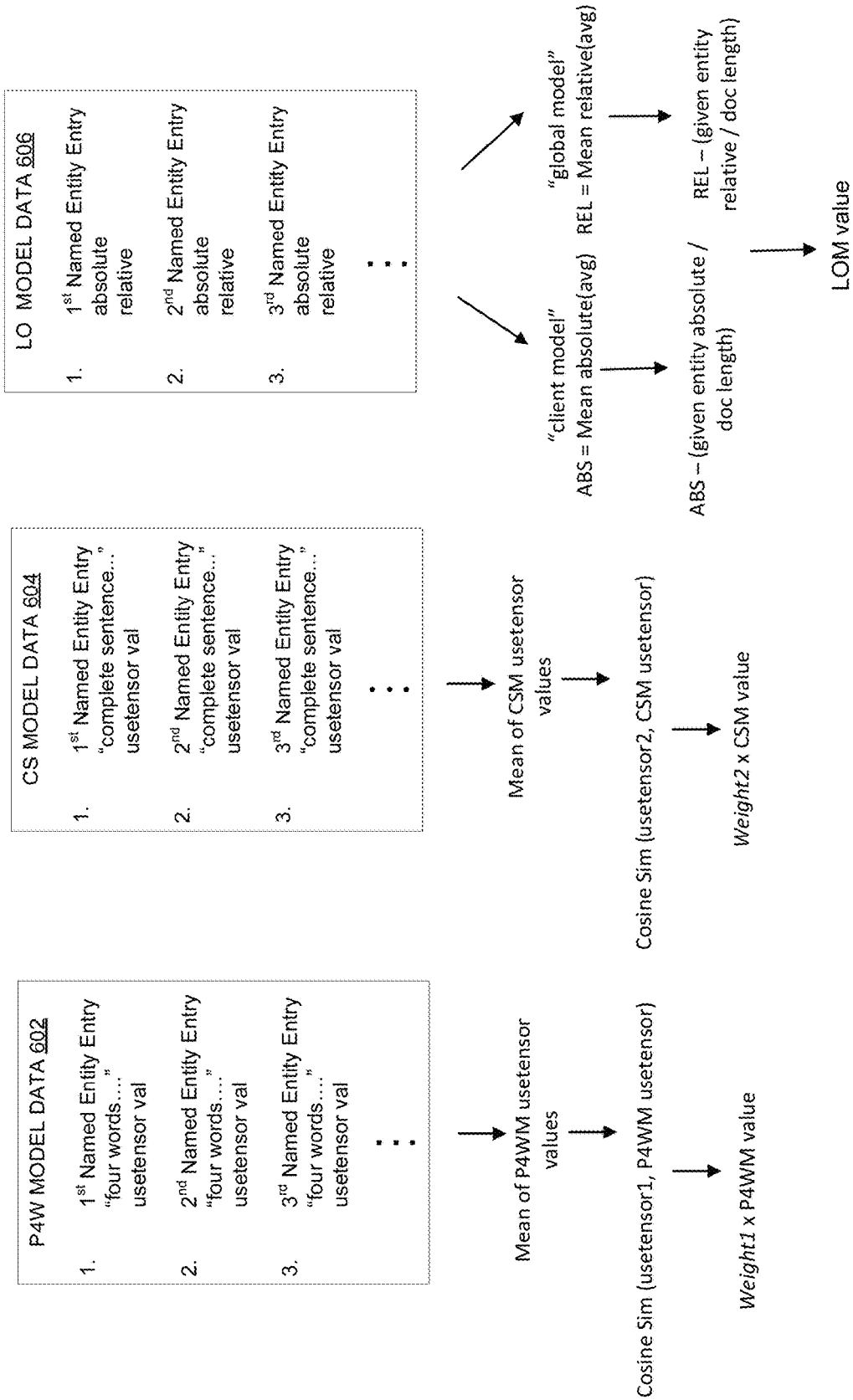
FIG. 6 illustrates a diagram of an exemplary environment in which some embodiments may operate.

As shown in the diagram 420 of FIG. 4B, a parameter 406 that is required by a document outline type 404 has its own corresponding component model data 406-1-1 for a Previous-4-Word model ("P4WM") 422, a Complete Sentence model ("CSM") 430 and a Location Offset Model ("LOM") 440. For each occurrence of a named entity from any scanned document that maps to a particular parameter, the respective named entity may have an entry in the P4WM 422, CSM 430 and LOM 440 for the particular parameter. For example, first and second entities ("$150,000.00" "$180,000.00") extracted from different Job Offer Letters may have separate mapped entity entries 424, 432, 442, 426, 434, 444 in the component model data 406-1-1 of the required Base Salary parameter 406. In the component model data 406-1-1, each mapped entity entry may a Previous-4-Word model ("P4WM") entry 424-1, 426-1, a Complete Sentence model ("CSM") entry 432-1, 434-1 and a Location Offset Model ("LOM") entry 442-1, 444-1.

It is understood that the NER model 402 may be a global model or a client model. A client NER model may be based on specific document outline types and parameters for various workflows and processes that are germane to a particular organization or corporation. A global NER model may be based on document outline types and parameters for various workflows and processes of multiple organizations, different types of organizations and/or different business domains. In some embodiments, the NER model 402 deployed to an organization may be bifurcated between a client model and a global model such that the NER Engine 212 may generate predictions from the client model and/or the global model.

As shown in the diagram 500 of FIG. 5A, one or more required parameters of a document outline type may have Previous-4-Word model data 502. For example, the P4W model data 502 may include data 504 from a first document that included a first named entity that mapped to a Job Title parameter. The data 504 is based on four words that appeared in the previous document before the mapped first named entity and a Universal Sentence Encoder Tensor ("useTensor") value of the four words. The P4W model data 502 may also include data 506 from the first document (or a second document) that included a second named entity that mapped to a Base Salary parameter. The data 506 is based on four words that appeared in the first document (or the second document) before the mapped second named entity and a useTensor value of the four words.

As shown in the diagram 520 of FIG. 5B, one or more required parameters of a document outline type may have Complete Sentence model data 522. For example, the CS model data 522 may include data 524 from the first document that included the first named entity that mapped to the Job Title parameter. The data 524 is based on a complete sentence in the first document that included the mapped first named entity and a useTensor value of the complete sentence. The CS model data 502 may also include data 526 from the first document (or the second document) that included the second named entity that mapped to a Base Salary parameter. The data 526 is based on a complete sentence in the first document (or the second document) that included the mapped second named entity and a useTensor value of the complete sentence.

As shown in the diagram 540 of FIG. 5C, one or more required parameters of a document outline type may have Location Offset model data 524. For example, the LO model data 542 may include data 544 from the first document that included the first named entity that mapped to the Job Title parameter. The data 544 is based on an absolute position of the first named entity in the first document and a relative position of the first named entity in the first document. An absolute position represents the first named entity's actual offset in the first document. The relative position represents the first named entity's offset relative to a total length of the first document. The LO model data 542 may also include data 546 from the first document (or the second document) that included the second named entity that mapped to a Base Salary parameter. The data 546 is based on an absolute position of the second named entity in the first document (or the second document) and a relative position of the second named entity in the first document (or the second document). The absolute position represents the second named entity's actual offset in the first document (or the second document). The relative position represents the second named entity's offset relative to a total length of the first document (or the second document).

The NER Engine 212 calculates a probability of whether a given named entity extracted from a given document correctly maps to a particular parameter of a document outline type, the NER Engine 212 uses the following formula: (Weight1×P4WM value+Weight2×CSM value)×

LOM value. As shown in the diagram 600 of FIG. 6, the NER Engine 212 calculates the probability of whether a given named entity from a document will correctly map to a particular required parameter. The NER Engine 212 identifies four words in the document that occur before the given named entity and calculates a usetensor value ("usetensor1") for those four words. The NER Engine 212 accesses the particular required parameter's P4W model data 602 and calculates a component wise mean tensor of the usetensor values ("P4WM usetensor") of all the named entities that previously mapped to the particular required parameter. The NER Engine 212 calculates the cosine similarity of the usetensor1 value and the P4WM usetensor to calculate the P4WM value.

The NER Engine 212 identifies a complete sentence in the document that includes the given named entity and calculates a usetensor value ("usetensor2") for the complete sentence. The NER Engine 212 accesses the particular required parameter's CS model data 604 and calculates a component wise mean tensor of the usetensor values ("CSM usetensor") of the same named entities that previously mapped to the particular required parameter. The NER Engine 212 calculates the cosine similarity of the usetensor2 value and the CSM usetensor to calculate the CSM value.

According to various embodiments, the LOM value may be calculated according to multiple approaches. For a client NER model, the LOM value may be calculated by determining a value ("ABS") based on an average of the absolute positions of all the previously mapped named entities in LO model data 606. The NER Engine 212 determines the absolute position of the given named entity and a document length of the given document in which the given named entity appears. The LOM value may thereby be calculated according to ABS—(given named entity's absolute position/given document length).

In the alternative, for a global NER model, the LOM value may be calculated by determining a value ("REL") based on an average of the relative positions of all the previously mapped named entities in LO model data 566. The NER Engine 212 determines the relative position of the given named entity and the document length of the given document in which the given named entity appears. The LOM value may thereby be calculated according to REL—(given named entity's relative position/given document length).

Figure 7:
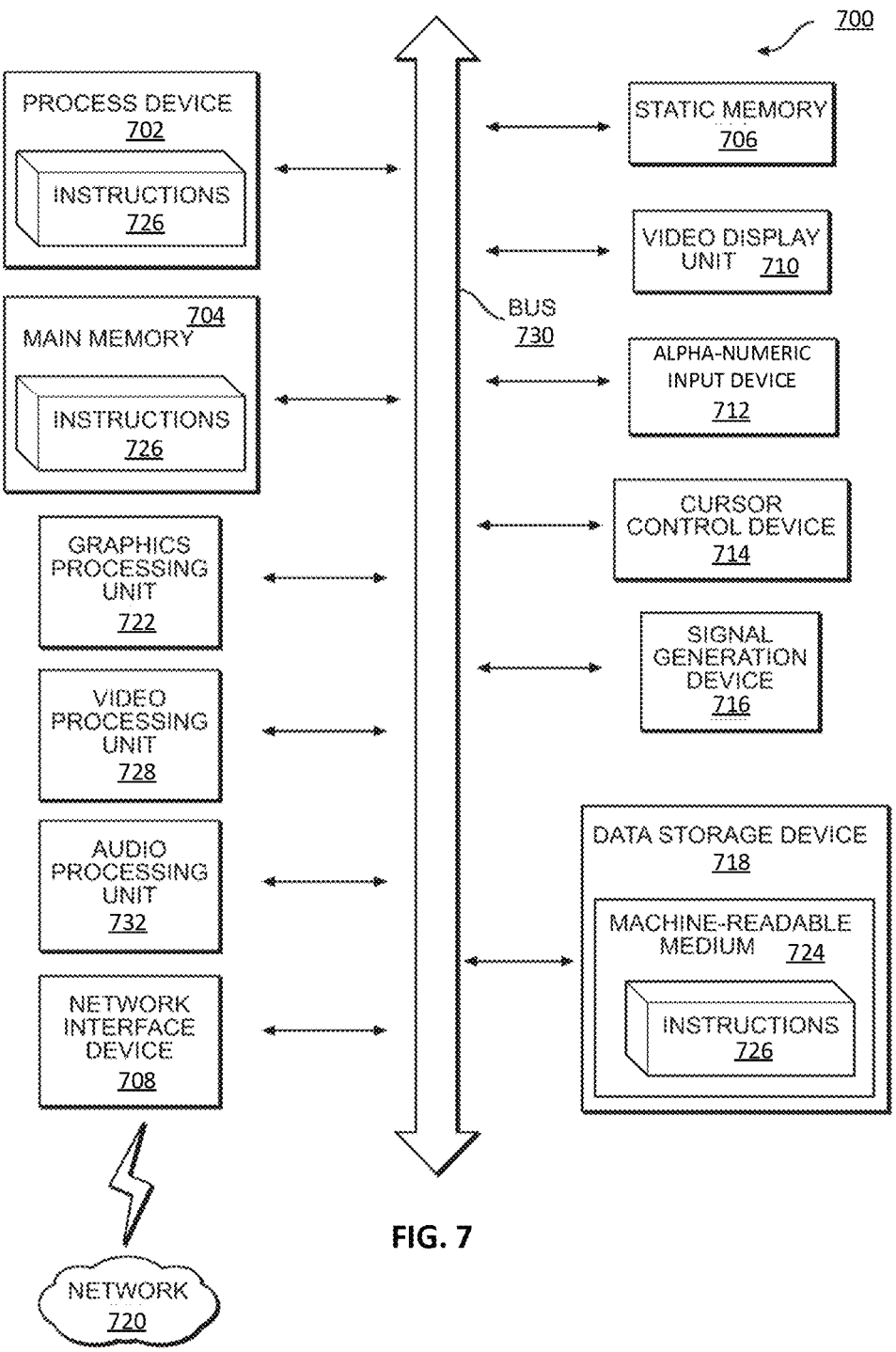
FIG. 7 is a diagram illustrating an exemplary environment in which some embodiments may operate.

FIG. 7 illustrates an example machine of a computer system within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 700 includes a processing device 702, a main memory 704 (e.g., read-only memory (ROM), flash memory, dynamic random access memory (DRAM) such as synchronous DRAM (SDRAM) or Rambus DRAM (RDRAM), etc.), a static memory 706 (e.g., flash memory, static random access memory (SRAM), etc.), and a data storage device 718, which communicate with each other via a bus 730.

Processing device 702 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 702 may also be one or more special-purpose processing devices such as an application specific integrated circuit (ASIC), a field programmable gate array (FPGA), a digital signal processor (DSP), network processor, or the like. The processing device 702 is configured to execute instructions 726 for performing the operations and steps discussed herein.

The computer system 700 may further include a network interface device 708 to communicate over the network 720. The computer system 700 also may include a video display unit 710 (e.g., a liquid crystal display (LCD) or a cathode ray tube (CRT)), an alphanumeric input device 712 (e.g., a keyboard), a cursor control device 714 (e.g., a mouse), a graphics processing unit 722, a signal generation device 716 (e.g., a speaker), graphics processing unit 722, video processing unit 728, and audio processing unit 732.

The data storage device 718 may include a machine-readable storage medium 724 (also known as a computer-readable medium) on which is stored one or more sets of instructions or software 726 embodying any one or more of the methodologies or functions described herein. The instructions 726 may also reside, completely or at least partially, within the main memory 704 and/or within the processing device 702 during execution thereof by the computer system 700, the main memory 704 and the processing device 702 also constituting machine-readable storage media.

In one implementation, the instructions 726 include instructions to implement functionality corresponding to the components of a device to perform the disclosure herein. While the machine-readable storage medium 724 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

Various general-purpose systems may be used with programs in accordance with the teachings herein, or it may prove convenient to construct a more specialized apparatus to perform the method. The structure for a variety of these systems will appear as set forth in the description above. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. The disclosure and drawings are, accordingly, to be regarded in an illustrative sense rather than a restrictive sense.

What is claimed is:

1. A computer-implemented method, comprising:
    initiating extraction of named entities from a current document, wherein the current document comprises a legal document;
    identifying one or more required parameters that correspond to a document outline type classification of the current document; and
    applying a named entity recognition model to the extracted named entities of the current document to predict a first mapping between a first extracted named entity from the current document and one or more required parameters of the identified document outline type classification, wherein applying the named entity recognition model comprises:
    accessing component model data of at least a second named entity, previously extracted from a first previous document that mapped to a first required parameter of the identified document outline type classification and a third named entity, previously extracted from a second previous document, that also mapped to the first required parameter, wherein the first previous document, the second previous document and the current document each comprise different documents; and
    generating a mapping prediction between the first extracted named entity from the current document and the first required parameter, the mapping prediction indicating the first extracted named entity from the current document is likely a value for the first required parameter, the component model data comprising:
    (i) Previous Number of Words (P4W) component model data comprising a first set of words that occurred in the first previous document prior to an occurrence of the second named entity and a second set of words that occurred in the second previous document prior to an occurrence of the third named entity, the first and the second set of words each comprising a same predefined number of words;
    (ii) Complete Sentence (CS) component model data comprising a first previous document complete sentence that included the second named entity and a second previous document complete sentence that included the third named entity; and
    (iii) Location Offset (LO) component model data comprising data representing a document position of the second named entity and a document position of the third named entity.

2. The computer-implemented method of claim 1, further comprising: generating a user interface for display of the predicted respective mapping, wherein generating the user interface comprises:
    receiving a user selection of indicating an approval of a displayed predicted mapping between a first extracted named entity and a first required parameter; and
    updating the named entity recognition model according to the approved predicted mapping.

3. The computer-implemented method of claim 2, wherein updating the named entity recognition model according to the approved predicted mapping comprises:
    capturing from the document an instance of P4 W component model data comprising a predefined number of words placed before the first extracted named entity;
    capturing from the document an instance of CS component model data comprising a sentence that includes the first extracted named entity; and
    capturing from the document an instance of LO component model data comprising data that corresponds to a document position of the first extracted named entity.

4. The computer-implemented method of claim 3, wherein updating the named entity recognition model according to the approved predicted mapping further comprises:
    updating the named entity recognition model by inserting the captured instances of component model data into the named entity recognition model as respective entries that correspond to the first required parameter.

5. The computer-implemented method of claim 1, wherein applying a named entity recognition model to the extracted named entities comprises:
    applying the named entity recognition model to determine a probability that a respective extracted named entity comprises current document data that is a value for a particular required parameter.

6. The computer-implemented method of claim 3, wherein applying the named entity recognition model comprises:
    accessing component model data for the required parameter, the component model data including one or more portions of previous document data from a plurality of different documents, wherein each of the one or more portions of previous document data+hat comprises a respective value mapped to the one or more required parameters of the identified document outline type classification.

7. The computer-implemented method of claim 1, wherein initiating extraction of named entities from the current document comprises:
    converting the current document content to raw text;
    applying one or more natural language processing models to the raw text;
    and receiving the extracted named entities from the one or more natural language processing models.

8. A system comprising one or more processors, and a non-transitory computer-readable medium including one or more sequences of instructions that, when executed by the one or moreprocessors, cause the system to perform operations comprising:
    initiating extraction of named entities from a current document, wherein the current document comprises a legal document;
    identifying one or more required parameters that correspond to a document outline type classification of the current document; and
    applying a named entity recognition model to the extracted named entities of the current document to predict a first mapping between a first extracted named entity from the current document and one or more required parameters of the identified document outline type classification, wherein applying the named entity recognition model comprises:
    accessing component model data of at least a second named entity, previously extracted from a first previous document, that mapped to a first required parameter of the identified document outline type classification and a third named entity, previously extracted from a second previous document, that also mapped to the first required parameter, wherein the first previous document, the second previous document and the current document each comprise different documents; and
    generating a mapping prediction between the first extracted named entity from the current document and the first required parameter, the mapping prediction indicating the first extracted named entity from the current document is likely a value for the first required parameter, the component model data comprising:
(i) Previous Number of Words (P4W) component model data comprising a first set of words that occurred in the first previous document prior to an occurrence of the second named entity and a second set of words that occurred in the second previous document prior to an occurrence of the third named entity, the first and the second set of words each comprising a same predefined number of words;
(ii) Complete Sentence (CS) component model data comprising a first previous document complete sentence that included the second named entity and a second previous document complete sentence that included the third named entity; and
(iii) Location Offset (LO) component model data comprising data representing a document position of the second named entity and a document position of the third named entity.

9. The system of claim 8, wherein applying a named entity recognition model to the extracted named entities comprises:
applying the named entity recognition model to determine a probability that a respective extracted named entity comprises current document data that is a value for a particular required parameter.

10. The system of claim 9, wherein applying the named entity recognition model comprises:
accessing component model data for the required parameter, the component model data including one or more portions of previous document data from a plurality of different documents, wherein each of the one or more portions of previous document data comprises a respective value mapped to the one or more required parameters of the identified document outline type classification.

11. The system of claim 8, further comprising: generating a user interface for display of the predicted respective mapping, wherein generating the user interface comprises:
receiving a user selection of indicating an approval of a displayed predicted mapping between a first extracted named entity and a first required parameter; and
updating the named entity recognition model according to the approved predicted mapping.

12. The system of claim 11, wherein updating the named entity recognition model according to the approved predicted mapping comprises:
capturing from the document an instance of P4 W component model data comprising a predefined number of words placed before the first extracted named entity;
capturing from the document an instance of CS component model data comprising a sentence that includes the first extracted named entity;
capturing from the document an instance of LO component model data comprising data that corresponds to a document position of the first extracted named entity; and
updating the named entity recognition model by inserting the captured instances of component model data into the named entity recognition model as respective entries that correspond to the first required parameter.

13. The system of claim 8, wherein initiating extraction of named entities from the current document comprises:
converting the current document content to raw text;
applying one or more natural language processing models to the raw text;
and receiving the extracted named entities from the one or more natural language processing models.

14. A computer program product comprising a non-transitory computer-readable medium having a computer-readable program code embodied therein to be executed by one or more processors, the program code including instructions to:
initiating extraction of named entities from a current document, wherein the current document comprises a legal document;
identifying one or more required parameters that correspond to a document outline type classification of the current document; and
applying a named entity recognition model to the extracted named entities of the current document to predict a first mapping between a first extracted named entity from the current document and one or more required parameters of the identified document outline type classification, wherein applying the named entity recognition model comprises:
accessing component model data of at least a second named entity, previously extracted from a first previous document, that mapped to a first required parameter of the identified document outline type classification and a third named entity, previously extracted from a second previous document, that also mapped to the first required parameter, wherein the first previous document, the second previous document and the current document each comprise different documents; and
generating a mapping prediction between the first extracted named entity from the current document and the first required parameter, the mapping prediction indicating the first extracted named entity from the current document is likely a value for the first required parameter, the component model data comprising:
(i) Previous Number of Words (P4W) component model data comprising a first set of words that occurred in the first previous document prior to an occurrence of the second named entity and a second set of words that occurred in the second previous document prior to an occurrence of the third named entity, the first and the second set of words each comprising a same predefined number of words;
(ii) Complete Sentence (CS) component model data comprising a first previous document complete sentence that included the second named entity and a second previous document complete sentence that included the third named entity; and
(iii) Location Offset (LO) component model data comprising data representing a document position of the second named entity and a document position of the third named entity.

15. The computer program product of claim 14, wherein initiating extraction of named entities from the current document comprises:
converting the current document content to raw text;
applying one or more natural language processing models to the raw text;
and receiving the extracted named entities from the one or more natural language processing models.

16. The computer program product of claim 14, wherein applying a named entity recognition model to the extracted named entities comprises:
applying the named entity recognition model to determine a probability that a respective extracted named entity comprises current document data that is a value for a particular required parameter.

17. The computer program product of claim 14, further comprising: generating a user interface for display of the predicted respective mapping, wherein generating the user interface comprises:
- receiving a user selection of indicating an approval of a displayed predicted mapping between a first extracted named entity and a first required parameter;
- updating the named entity recognition model according to the approved predicted mapping;
- receiving a user selection of indicating an approval of a displayed predicted mapping between a first extracted named entity and a first required parameter;
- capturing from the document an instance of P4 W component model data comprising a predefined number of words placed before the first extracted named entity;
- capturing from the document an instance of CS component model data comprising a sentence that includes the first extracted named entity;
- capturing from the document an instance of LO component model data comprising data that corresponds to a document position of the first extracted named entity; and
- updating the named entity recognition model by inserting the captured instances of component model data into the named entity recognition model as respective entries that correspond to the first required parameter.

* * * * *